(12) United States Patent
Hopkins et al.

(10) Patent No.: US 11,709,607 B2
(45) Date of Patent: Jul. 25, 2023

(54) STORAGE BLOCK ADDRESS LIST ENTRY TRANSFORM ARCHITECTURE

(71) Applicant: International Business Machines Corporation, Armonk, NY (US)

(72) Inventors: Luke Hopkins, Peterborough, NH (US); Michael James Becht, Poughkeepsie, NY (US); Christopher J. Colonna, Ossining, NY (US); Stephen Robert Guendert, Poughkeepsie, NY (US); Pasquale A. Catalano, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 17/475,703

(22) Filed: Sep. 15, 2021

(65) Prior Publication Data
US 2023/0084861 A1   Mar. 16, 2023

(51) Int. Cl.
*G06F 3/06* (2006.01)

(52) U.S. Cl.
CPC ............ *G06F 3/064* (2013.01); *G06F 3/0604* (2013.01); *G06F 3/0613* (2013.01); *G06F 3/0659* (2013.01); *G06F 3/0679* (2013.01)

(58) Field of Classification Search
CPC ...... G06F 3/064; G06F 3/0604; G06F 3/0613; G06F 3/0659; G06F 3/0679
See application file for complete search history.

(56) References Cited

U.S. PATENT DOCUMENTS

| | | | |
|---|---|---|---|
| 6,341,321 B1* | 1/2002 | Glassen | G06F 9/24 712/E9.007 |
| 6,854,021 B1* | 2/2005 | Schmidt | G06F 3/0613 710/36 |
| 9,263,102 B2 | 2/2016 | Flynn et al. | |
| 10,223,300 B2 | 3/2019 | Easton et al. | |
| 2005/0289246 A1 | 12/2005 | Easton et al. | |
| 2011/0106990 A1* | 5/2011 | Higgs | G06F 13/385 710/73 |
| 2012/0079175 A1* | 3/2012 | Flynn | G06F 3/061 711/170 |
| 2013/0007182 A1* | 1/2013 | Macchiano, Sr. | G06F 9/541 709/213 |
| 2022/0188248 A1* | 6/2022 | Becht | G06F 13/1668 |

OTHER PUBLICATIONS

International Search Report; International Application No. PCT-EP2022-073659; International Filing Date: Aug. 25, 2022; dated Dec. 14, 2022; 16 pages.
Peter Mell et al., "The NIST Definition of Cloud Computing", NIST, Special Publication 800-145, Sep. 2011, 7 pages.

* cited by examiner

*Primary Examiner* — Francisco A Grullon
(74) *Attorney, Agent, or Firm* — Cantor Colburn LLP; Edward Wixted

(57) ABSTRACT

Aspects include obtaining data to be transformed. A selected transformation to be applied to the data is determined based on a storage block address list entry (SBALE) in a storage block address list (SBAL). The SBALE includes at least one field that is used in determining the selected transformation to be applied. The selected transformation is applied on the data to generate transformed data and the transformed data is placed in a location specified by the SBAL.

17 Claims, 13 Drawing Sheets

| Word | Byte 0 | Byte 1 | Byte 2 | Byte 3 |
|---|---|---|---|---|
| Word 0 | Flags = 0 | Reserved | Trailing SBAL Count | SBALF0 |
| Word 1 | Reserved | | First Data Division SBALE Count | |
| Word 2 | Request ID | | | |
| Word 3 | | | | |

| Word | Byte 0 | Byte 1 | Byte 2 | Byte 3 |
|---|---|---|---|---|
| Word 0 | Flags | Reserved | 0x00 | Storage Key (bits 4-7) |
| Word 1 | Reserved | | Size of QTCB <= 0x6A0 | |
| Word 2 | Address of QTCB in Host Memory | | | |
| Word 3 | | | | |

404

| Word | Byte 0 | Byte 1 | Byte 2 | Byte 3 |
|---|---|---|---|---|
| Word 0 | Flags | Reserved | 0x00 | 0x00 |
| Word 1 | Reserved | | Size of Storage | |
| Word 2 | Address of Storage Block in Host Memory | | | |
| Word 3 | | | | |

FIG. 4

| Word | Byte 0 | Byte 1 | Byte 2 | Byte 3 |
|---|---|---|---|---|
| Word 0 | Flags = 0x80 (Operator) | Operator Type Flags (0x01 = Transform) (0x02 = Placement) (0x80 = Immediate) | Transform or Placement ID | Operator Specific Flags Placement: 0x01 = outbound or inbound (only for Persistent Case) 0x02 = Virt, Phys 0x04 = One Time, Persist Transform: 0x02 = Transform applied only to marked SBALEs |
| Word 1 | Type or Transform ID | Subtype or Transform ID | Operator Specific as Needed | |
| Word 2 | Control Block Pointer high order bytes if not immediate otherwise for immediate data this is operator specific | | | |
| Word 3 | Control Block Pointer low order bytes if not immediate otherwise for immediate data this is operator specific | | | |

FIG. 5

| Word | Byte 0 | Byte 1 | Byte 2 | Byte 3 |
|---|---|---|---|---|
| Word 0 | Flags = 0x80 (Operator) | Operator Type Flags (0x82 = Immediate Placement) | Placement ID = 0x02 | Operator specific flags = 0x06 implies (virt, one time). |
| Word 1 | Transform ID = 0x00 | Transform ID = 0x01 | Transform ID = 0x02 | Sentinel = 0xFF |
| Word 2 | Destination Memory Address High | | | |
| Word 3 | Destination Memory Address Low | | | |

FIG. 6

| Word | Byte 0 | Byte 1 | Byte 2 | Byte 3 |
|---|---|---|---|---|
| Word 0 | Flags = 0x80 (Operator) | Operator Type Flags (0x01 = Non-Immediate Placement) | Placement ID = 0x02 | Operator specific flags = 0x06 implies (out, virt, persistent) |
| Word 1 | xxx | xxx | xxx | xxx |
| Word 2 | Placement Control Block Address High | | | |
| Word 3 | Placement Control Block Address Low | | | |

FIG. 7

| Word | Byte 0 | Byte 1 | Byte 2 | Byte 3 |
|---|---|---|---|---|
| Word 0 | Flags = 0x80 (Operator) | Operator Type Flags (0x01 = Non-Immediate Transform) | Transform ID = 0x01 | Operator specific flags = 0x00 (Applies to all SBALEs) |
| Word 1 | Type = p | Subtype = q | xxx | xxx |
| Word 2 | Transform Control Block Address High | | | |
| Word 3 | Transform Control Block Address Low | | | |

FIG. 8

STORAGE BLOCK ADDRESS LIST ENTRY TRANSFORM ARCHITECTURE

BACKGROUND

The present invention relates generally to facilitating input/output (I/O) processing within a computing environment, and more specifically, to providing a storage block address list entry (SBALE) transform architecture.

I/O processing includes transferring data between main memory of a computing system and one or more external devices coupled to the computing system. To facilitate the transfer of data, one or more I/O operations are employed. I/O operations are used to obtain data from one or more external storage devices, perform one or more operations on the data, and store the results back to one or more storage devices. One type of operation that may be performed on the data is a transformation.

SUMMARY

Embodiments of the present invention are directed to a storage block address list entry (SBALE) transform architecture. A non-limiting example computer-implemented method includes obtaining data to be transformed. A selected transformation to be applied to the data is determined based on a SBALE in a storage block address list (SBAL). The SBALE includes at least one field that is used in determining the selected transformation to be applied. The selected transformation is applied on the data to generate transformed data and the transformed data is placed in a location specified by the SBAL.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts a block diagram of a command SBAL according to one or more embodiments of the present invention;

FIG. 4 depicts a block diagram of a queue-transfer-control block (QTCB) SBALE and a data SBALE according to one or more embodiments of the present invention;

FIG. 5 depicts a block diagram of an operator SBALE according to one or more embodiments of the present invention;

FIG. 6 depicts a block diagram of an immediate placement operator SBALE according to one or more embodiments of the present invention;

FIG. 7 depicts a block diagram of a control block-based placement operator SBALE according to one or more embodiments of the present invention;

FIG. 8 depicts a block diagram of a control block-based transform Operator SBALE according to one or more embodiments of the present invention;

Figure 1:
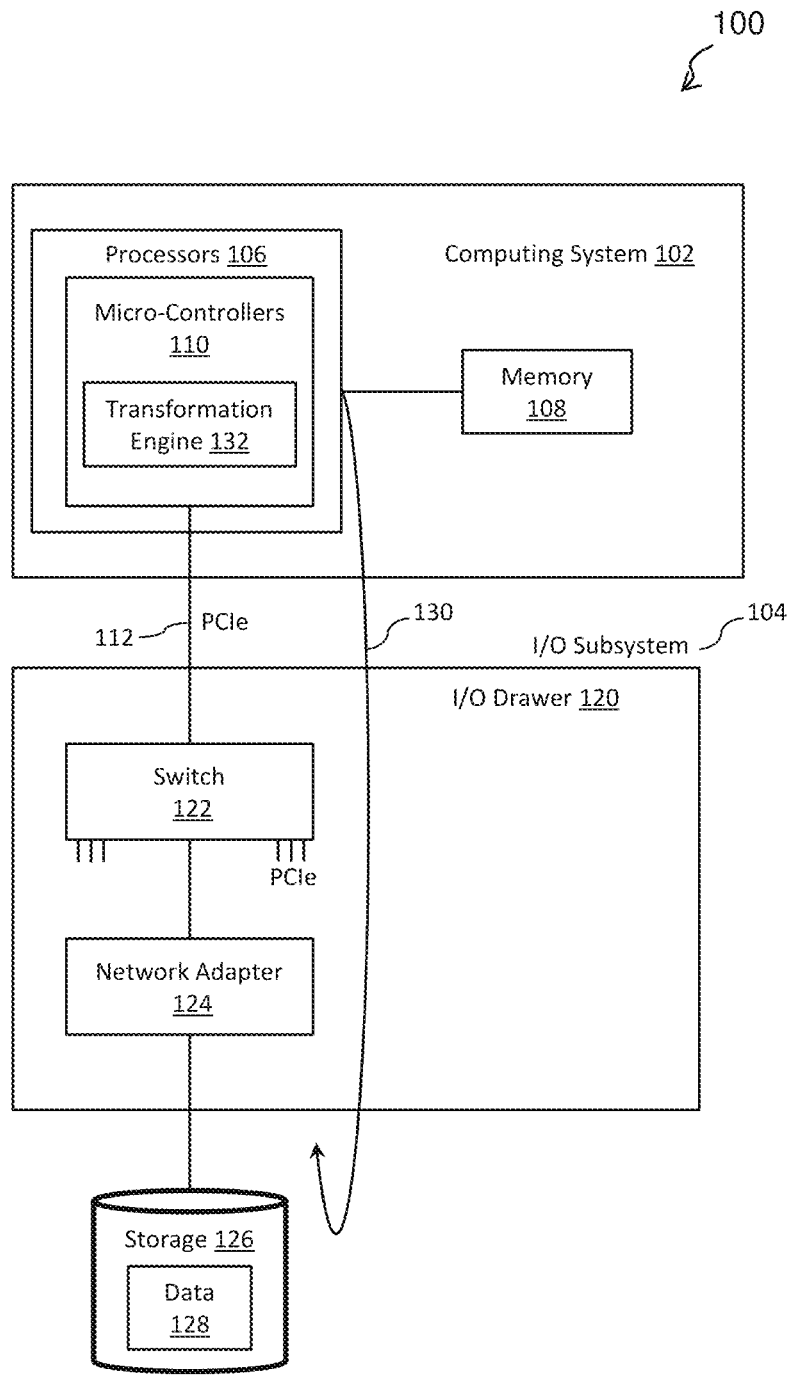
FIG. 1 depicts a block diagram of a computing environment for providing a storage block address list entry (SBALE) transform architecture according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention facilitate queued-direct input/output (QDIO) processing by providing a storage block address list entry (SBALE) transform architecture. In accordance with one or more embodiments of the present invention, input/output (I/O) processing is facilitated by performing transformations on data being moved between a computing system and an external storage device in-line to the data movement. That is, a decision to perform and the performance of a transformation occur in a direct path between the computing system and the external storage device. As an example, one or more micro-controllers (and/or processing logic) of the computing system and/or the I/O system determine whether to perform a transformation and then perform the transformation independent of an additional machine, such as a host controller, or other component external to the computing system and the I/O system.

One or more embodiments of the present invention utilize SBALEs to specify one or more operators to be applied to inbound or outbound data. Operator types can include transform operators and placement operators. Transform operators can include, but are not limited to, filters and statistical and mathematical operations. A transform can also have a state machine associated with it so that it can change over time based on a sequence of events. The state machine can be specified in a domain specific language (DSL). Placement operators can specify, for example, the destination of data (virtual or physical), whether it is to be persistent or not, which transforms are to be applied to the data that will go to the specified destination, and in which order the transforms are to be applied. In accordance with one or more embodiments of the present invention, there can be multiple placement operators associated with a transaction that use different transforms, or multiple placements for each storage block address list (SBAL). Each placement operator can refer to a set of transform operator identifiers that are applied in the order specified.

QDIO is a data transfer architecture which can be used to improve data transfer speed and efficiency for Transmission Control Protocol/Internet Protocol (TCP/IP) traffic when compared to other data transfer architectures. QDIO provides a means for a program, such as an operating system (OS) to, directly and asynchronously, communicate with one or more I/O devices or a network of devices by the use of data queues constructed and managed in main storage of an implementing computer system. Each QDIO queue contains one or more SBALs, and each SBAL includes a plurality of SBALEs. An SBAL, count (e.g., contained in one of the SBALEs) can indicate a number of SBALs forming an I/O request to an I/O device. The queues allow the communication to be performed in a predictable and efficient manner without requiring services of a centralized controlling mechanism, such as an OS I/O supervisor, and the resulting overhead such a mechanism implies.

Contemporary approaches to performing data transformations in a QDIO environment include a system requesting data from an external storage device and obtaining the data from the external storage device via an I/O subsystem coupled to the system and the external storage device. The data that is obtained from the external storage device is provided to another machine, external to the system and the I/O subsystem, that determines which, if any transformation (s) to be applied to the data and performs the transformation (s). The transformed result is then obtained by the system and may be stored to an external storage device.

This is contrasted with one or more embodiments of the present invention where transformations are determined and applied by an I/O subsystem based on contents of a SBAL control block. By using an I/O control block (e.g., a SBAL control block), a determination of whether to perform a transformation and performance of the transformation, if any, are performed independent of an additional machine, such as a host controller, or other component external to the computing system and I/O subsystem. This can lead to improvements in I/O processing performance and therefore, system performance can be improved.

In addition, by using a SBAL control block (e.g., a SBALE in a SBAL) to determine the type of transformation to be applied to the data, the determination of a selected transformation to be performed is facilitated, thereby improving system performance, reducing complexity, and reducing the hardware to be used (e.g., no separate machine to perform the checking). One or more embodiments of the present invention also allow for specifying different transformations to be applied to the same data stream simultaneously and to direct the result to different destination. Further, the way in which the transformations are associated with target data is defined in the SBAL control block.

Turning now to FIG. 1, a block diagram of a computing environment 100 for providing a SBALE transform architecture is generally shown in accordance with one or more embodiments of the present invention. As an example, the computing environment of FIG. 1 is based on the z/Architecture® hardware architecture offered by International Business Machines Corporation. The z/Architecture hardware architecture, however, is only one example architecture. Aspects of the invention may also be based on other architectures, including, but not limited to, the Intel x86 architectures, other architectures of International Business Machines Corporation, and/or architectures of other companies.

Referring to FIG. 1, in one example, a computing environment 100 includes a computing system 102 coupled to an input/output subsystem 104. As an example, computing system 102 includes one or more processors 106 coupled to memory 108 (also referred to as main memory, system memory, storage, main storage, central storage, etc.). In accordance with one or more embodiments of the present invention, the memory 108 includes QDIO queues for storing SBALs. All or a portion of the computing system 102 shown in FIG. 1 can be implemented on one or more computing nodes 10 of FIG. 11 and/or computer system 1300 of FIG. 13.

Processors 106 are coupled to I/O subsystem 104 via one or more connections or buses 112, such as one or more Peripheral Component Interconnect express (PCIe) connections. Other connections or buses may also be used. All or a portion of the connections or buses shown in FIG. 1 can be implemented by at least a portion of cloud environment 50 of FIG. 11 and/or network 1312 of FIG. 13.

I/O subsystem 104 includes one or more input/output drawers 120, and an I/O drawer 120 includes, for instance, one or more switches 122 and one or more network adapters 124. All or a portion of the I/O subsystem 104 shown in FIG. 1 can be implemented on one or more computing nodes 10 of FIG. 11 and/or computer system 1300 of FIG. 13. In one example, a switch 122 is coupled to a processor 106 and a network adapter 124. Network adapter 124 is, for instance, a converged network adapter (CNA), which is, for instance, a single network interface card (NIC) that contains both a Fibre Channel (FC) host bus adapter (HBA) and a TCP/IP Ethernet NIC. It connects servers to FC-based storage area networks (SANs) and Ethernet-based local area networks (LANs), as an example.

I/O subsystem 104 is coupled to one or more external storage devices 126 and is used to couple processors 106 to external storage devices 126. Data 128 stored on the external storage devices 126 is transported between the processors 106 and external storage devices 126 via, for instance, I/O operations. As an example, an OS, such as a z/OS® operating system offered by International Business Machines Corporation or a Linux® OS, executing within a processor (e.g., processor 106) uses one or more I/O operations to pull data (e.g., data 128) from an external storage device (e.g., external storage device 126) along a path, such as path 130. Other OSs may also be used.

In one example, one or more processors 106 include one or more micro-controllers 110 used in accordance with one or more aspects of the present invention. For instance, as described herein, one or more of micro-controllers 110 (and/or processing logic of the computing system) are used to determine whether a transformation is to be applied to data of an I/O operation, and to perform a transformation, if a transformation is to be applied. In accordance with one or more embodiments of the present invention, the transformation is performed by transformation engine 132 of FIG. 1 which is a separate microcontroller or is included within a micro-controller (e.g., micro-controller 110).

The one or more micro-controllers (and/or processing logic of the computing system) are used instead of, for instance, a host controller or other controller coupled to the I/O subsystem via one or more connections (e.g., PCIe connections) coupled to a switch (e.g., switch 122). Thus, the decision and performance of a transformation occur in-line with the I/O operation. That is, the decision and performance of the transformation are performed within path 130, independent of a host controller or other such controller coupled to the I/O subsystem outside of path 130.

In a further embodiment, one or more micro-controllers may be located in the I/O subsystem 104 and used, in accordance with an aspect of the present invention, to determine whether a transformation is to be applied and/or to perform such a transformation based on a decision to apply the transformation. Other embodiments are also possible.

The embodiments described herein with respect to the computing environment 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
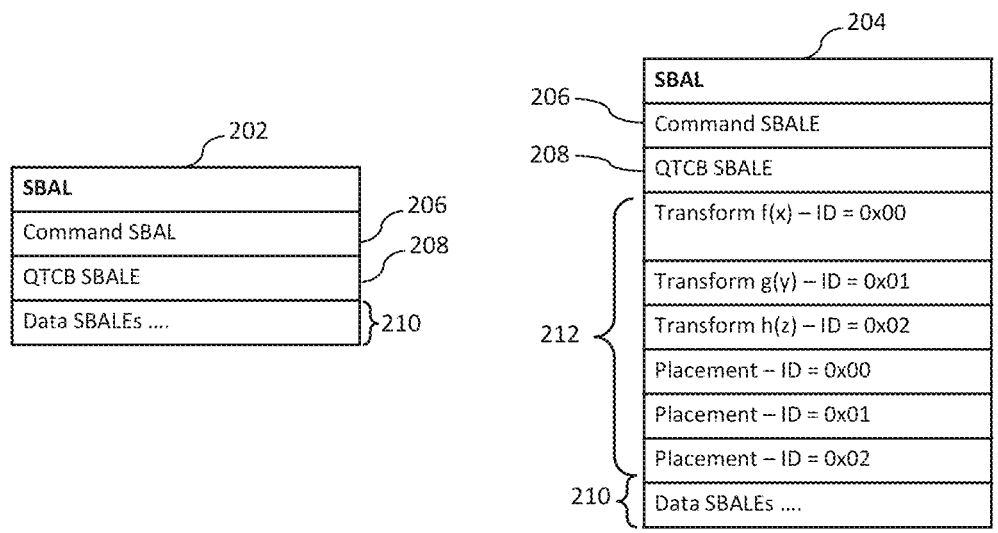
FIG. 2 depicts a block diagram of storage block address lists (SBALs) according to one or more embodiments of the present invention.

Turning now to FIG. 2, two examples of SBALs, SBAL 202 and SBAL 204, are generally shown in accordance with one or more embodiments of the present invention. SBAL 202 and SBAL 204 can be stored, for example in queues in memory 108 of FIG. 1. SBAL 202 included a plurality of entries: command SBAL 206, QTCB SBALE 208, and one or more data SBALEs 210. In accordance with one or more embodiments of the present invention, command SBAL 206 is configured as shown in command SBAL 300 of FIG. 3, and QTCB SB ALE 1 208 is configured as shown in QTCB SBALE 402 of FIG. 4 below. One or more data SBALEs 210 are located at the end of SBAL 202, and in accordance with one or more embodiments of the present invention the data SBALEs 210 are configured as shown in data SABLE 404 of FIG. 4 below. In accordance with one or more embodiments of the present invention, an SBAL such as that shown in SBAL 202 can be used when the SBAL does not contain any data transformation or data placement instructions.

When data transformation is performed by the I/O subsystem, one or more embodiments of the present invention utilize an SBAL 204 that is similar to SBAL 202 but that includes additional operator SBALEs 212 to specify the data transformation(s) and the location(s) for placing the transformed data as shown in SBAL 204 of FIG. 2. SBAL 204 includes command SBAL 206, QTCB SBALE 208, one or more operator SBALEs 212, and one or more data SBALEs 210. Examples embodiments of operator SBALEs 212 are shown in FIGS. 5-8 below. Embodiments of the present invention can include none, one, or more operator SABLEs 212 and are not limited to the three transform and three placement SBALEs 212 shown in SBAL 204 FIG. 2.

In accordance with one or more embodiments of the present invention, SBAL 204 may or may not include any data SBALEs 210 and may or may not include a QTCB SBALE 208. For example, an SBAL 204 may include just a command SBLAE 206 followed by additional operator SBALEs 212 specifying transforms and placement. This configuration may be used to convey a persistent operator, or to cancel a persistent operator.

Turning now to FIG. 3, a block diagram of a command SBAL 300 is generally shown in accordance with one or more embodiments of the present invention. The command SBAL 300 includes four words: Word 0, Word 1, Word 2, and Word 3; with each word having four bytes: Byte 0, Byte 1, Byte 2, and Byte 3. The fields in the command SBAL 300 include Flags (which are set to zero to indicate that this block contains a command SBAL), Trailing SBAL Count, SBALF0, First Data Division SBALE Count, Request ID, and two Reserved fields. The Trailing SBAL count indicates the number of SBALs that follow the command SBAL; the First Data Division SBALE Count indicates the number of SBALEs in the write portion of a write-read request or the number of protection SBALEs in an I/O request; and the Request ID is a unique identifier among all outstanding requests on a queue.

Referring to the SBALF0 field in the command SBAL 300 of FIG. 3, bit 0 can be reserved; bit 1 can indicate a program requested progress reporting interrupt for read of the command SBALE; bits 2-3 can indicate an operation (storage block) type (status read, write, read, write-read) which is only used by command SBALEs; bits 5-6 can indicate SBAL sequence type (last SBAL of chain, no SBAL (no chaining)—trailing SBAL count=zero, middle SBAL in chain, first SBAL of chain—trailing SBAL count is greater than zero); and bit 7 can be reserved.

Turning now to FIG. 4, a block diagram of a QTCB SBALE 402 and a data SBALE 404 are generally shown in accordance with one or more embodiments of the present invention. The QTCB SBALE 402 and the data SBALE 404 are examples of SBALEs that can be used for outbound data and they each include four words: Word 0, Word 1, Word 2, and Word 3; with each word having four bytes: Byte 0, Byte 1, Byte 2, and Byte 3. The fields in the QTCB SBALE 402 shown in FIG. 4 include Flags, Storage Key, Size of QTCB, Address of QTCB in Host Memory, and two Reserved fields. The fields in the data SBALE 404 shown in FIG. 4 include Flags, Size of Storage Block, Address of Storage Block in Host Memory, and two Reserved fields.

Referring to the Flags field in the QTCB SABLE 402 and data SABLE 404, bit 0 can indicate if this is an operator SBALE; bit 1 can indicate if this is the last SBALE (Entry), bit 2 can indicate if the address points to a contiguous storage within a 4K block (not used by channel), and bits 3-7 can be reserved. For both the QTCB SABLE 402 and the data SABLE 404 shown in FIG. 4, bit 0 is not set because they are not operator SBALEs. In accordance with one or more embodiments of the present invention, bit 7 in the Flags field can be set to indicate that the transform should only be applied to marked SBALEs. If bit 7 is not set, then then all of the data in the SBAL will be transformed/placed.

Turning now to FIG. 5, a block diagram of an operator SBALE 500 for performing data transformation and placement is generally shown in accordance with one or more embodiments of the present invention. The operator SBALE 500 shown in FIG. 5 includes four words: Word 0, Word 1, Word 2, and Word 3; with each word having four bytes: Byte 0, Byte 1, Byte 2, and Byte 3. The fields in the operator SBALE 500 of FIG. 5 include Flags (with bit 0 set to indicate that this is an operator SABLE), Operator Type Flags, Transform or Placement Identifier, Operator Specific Flags, Type or Transform ID, Subtype or Transform ID, Operator Specific as Needed, and Control Block Pointers or Operator Specific data. As shown in FIG. 5, the Operator Type Flags field indicates whether the operation is a transform, a placement, or an immediate placement at an address location specified in the operator SBALE. The Operator Specific Flags field includes bits bit that apply to placement operations that include bits that indicate whether the data is outbound data or inbound data (used only when the placement operator is to be applied persistently and not used for transforms or one time placement operators), whether the placement is to a physical location (e.g., to a port on a network adapter) or virtual location (e.g., to a memory address), and whether the placement location is used one time or persistently or only one time; and for transformation operators whether the transformation applies only to marked SBALEs (e.g., to transform only a subset of the data including those with a flag bit set).

As described previously, data that is received from an I/O device may need to be transformed before it is used by the program requesting the data. Types of transformations that can be identified in the Transform or Placement ID field of an operator SBALE, such as operator SBALE 500, can include, but are not limited to, an artificial intelligence transformation, data hashing, data compression, a packet filter, a data format transformation, a transformation based on a statistical analysis, telemetry transformation, and data replication. In statistical analysis, a data transformation can be, for example, an application of a deterministic mathematical function to each data point in a data set, such that each data point $z_i$ is replaced with a transformed value $y_i=f$, where f is a mathematical function. With telemetry transformation, sensory data can be obtained by the system, for example, and may be transformed for ease of use of the sensory data. In another example, multicast transformation can include data replication where data is mirrored to a second port to hook-up to an analyzer, and the second port may be non-encrypted so the data can be looked at in-flight to debug, where the traffic is sent down to an encrypted card. Embodiments of the present invention are not limited to the above examples of transformations, as embodiments can be utilized to perform any transformation or group of transformations that receive input data and generate output data that is different (e.g., fewer or more data records, different format, and/or different data, etc.) than the input data.

In accordance with one or more embodiments of the present invention, an example of a value in the Type or Transform ID field includes packet capture, statistical operation, telemetry, or port mirror; an example of a value in a Subtype or Transform ID field is an identifier of a specific type of packet capture, a type of statistical average to compute, a mathematical transform to apply to telemetry data, or a type of port mirroring; and an example of a value in an Operator Specific as Needed field is a value that is specific to the transform that is specified by the type and subtype.

Turning now to FIG. 6, a block diagram of an immediate placement operator SBALE 600 for performing data transformation and placement is generally shown in accordance with one or more embodiments of the present invention. The immediate placement operator SBALE 600 contains all of the information needed to perform the placement in the SBAL itself, as opposed to also requiring an external buffer to convey additional information. This implies that once the I/O engine has the SBALE 600, it will know everything needed to perform the placement. Thus, it is more compact than conventional approaches and it can be used for cases that require high efficiency, such as non-persistent placement on individual operations.

The fields in the immediate placement operator SBALE 600 shown in FIG. 6 include a Flags field (with bit 0 set to indicate that this is an operator SABLE), Operator Type Flags set to indicate immediate placement of the data (at the address in Word 2 and Word 3 of the SBALE 600), a Placement ID that identifies the placement operator and can be used to cancel (or remove) a persistent placement operator (one that applies to multiple operations). That the persistent placement is to be canceled can be conveyed by a reserved Transform ID in byte 0 of word 1 or it could be conveyed using a special transform operator. Operator Specific Flags indicating that the transform and placement operations should occur one time with results stored to a virtual location, three Transform IDs identifying the transforms to be applied to the data, a Sentinel field indicating that there are no more transformations IDs, and a destination memory address wherein the transformed data should be placed. In the example shown in FIG. 6, three transforms are applied to the data in the order shown in Word 1 and the resulting data is stored starting at the address in Word 2 and Word 3.

Turning now to FIG. 7, a block diagram of a control block-based placement operator SBALE 700 is generally shown in accordance with one or more embodiments of the present invention. The non-immediate case for a placement operator, such as that shown in control block-based placement operator SBALE 700, can allow for a more complex placement operation that is typically used in the persistent cases. As used herein the terms "persistent case" refers to placement that applies to all of the data in the SBAL. Additional overhead is used for fetching the control block however this is not an issue for the persistent version (or persistent case) because it is only performed once for the SBAL. In accordance with one or more embodiments of the present invention the persistent case means that it applies to this operation and all subsequent operations, not just this SBAL. It should be noted that a single operation may be described by a chain of SBALs. The first SBAL for an operation is called the command SBLAL, but there may be more. Thus, a persistent placement operator establishes a set of transforms and placement for all subsequent operations, until it is canceled, and will potentially cover multiple independent SBALs or SBAL chains.

Examples of more complex placement operations that can be performed using the control block-based placement operator SBALE 700 shown in FIG. 7 include, but are not limited to, specifying the destination address of an external networking device to which the data, or part of the data should be forwarded. Another complex placement operator may specify the characteristics of a wrapping buffer including the location in memory in which data should be placed and any additional meta information about the buffer such as its size, etc.

The fields in the control block-based placement operator SBALE 700 shown in FIG. 7 include a Flags field (with bit 0 set to indicate that this is an operator SABLE), Operator Type Flags set to indicate non-immediate placement, a Placement ID, Operator Specific Flags indicating that the data is outbound in a persistent manner (i.e., a persistent case) to a virtual location, and a Placement Control Block Address. In accordance with one or more embodiments of the present invention when the Operator Specific Flags indicate that the data is being placed, or stored, at a virtual location, the Placement Control Block includes information such as, but not limited to, a wrap buffer flag, a wrap buffer size, a wrap buffer location, and/or a current index into the wrap buffer. If the Operator Specific Flags indicate that the placement is at a physical location, then the Placement Control Block includes information needed to locate the network adapter (e.g., a host bus adapter).

Turning now to FIG. 8, a block diagram of a control block-based transform operator SBALE 800 is generally shown in accordance with one or more embodiments of the present invention. Control block-based transform operator SBALE 800, can be used to perform transformation operations such as, but not limited to providing specific types of packet filters for operation captures, where there are certain filters that are encoded in the control block to capture only some parts or types of operations. A control block transform can also be used to specify mathematical operations to be performed on data sets that are being read by I/O operations.

These operations can be applied to telemetry data and may result in a transformed data set that is placed by the associated placement operator. The resulting data may be a value, or some number of values that summarizes the data based on the applied operator. There can be a write data stream that goes to a destination device in unmodified form, and a mathematically reduced result that is stored via the placement operator to memory or one or more external devices. Similarly, a read data stream can be read in unmodified form into memory with a corresponding mathematically reduced data stream that is placed in memory or sent to an external device by the associated placement operator.

The fields in the control block-based transform operator SBALE 800 shown in FIG. 8 include a Flags field (with bit 0 set to indicate that this is an operator SABLE), Operator Type Flags set to indicate non-immediate transform, a Transform ID that is the ID referred to by a placement operator in a placement operator SBALE, Operator Specific Flags indicating that the data is outbound, a Type field set to "p" which can be a numeric value indicating the transformation type, a Subtype field set to "q" which can be a numeric value indicating the transformation subtype, and a Transform Control Block Address where data describing the transform, or transform metadata, is located. The Transform Control Block address may point to a buffer, a data file, a state machine, etc. In accordance with one or more embodiments of the present invention, p may refer to an operation capture transform, and q may refer to an operation capture subtype that includes packet capture with a trigger state machine. In accordance with one or more embodiments of the present invention, the transform control block address can refer to state machine information that specifies which event begins a capture, which event ends a capture, and a filter that determines what gets captured when we are in the capturing state. In accordance with one or more embodiments of the present invention the transform metadata can include an encryption key(s) that is used to encrypt or to decrypt the data.

Although specific fields, locations of fields, sizes of fields, bits and values of fields or bits are shown and described herein for one or more embodiments of the SBALs and SBALEs of FIGS. 2-8, other fields, locations of fields, sizes of fields, bits and/or values of fields or bits may be used without departing from a spirit of one or more embodiments of the present invention. Fields and/or sub-fields of each of the fields not described herein may be blank, have a pre-defined value (e.g., zero), and/or include values to be ignored in one embodiment. Further, the SBALs and SBALEs used by exemplary embodiments of the present invention may include additional, fewer and/or other fields or sub-fields of fields to be used in input/output processing. Many possibilities exist.

Figure 9:
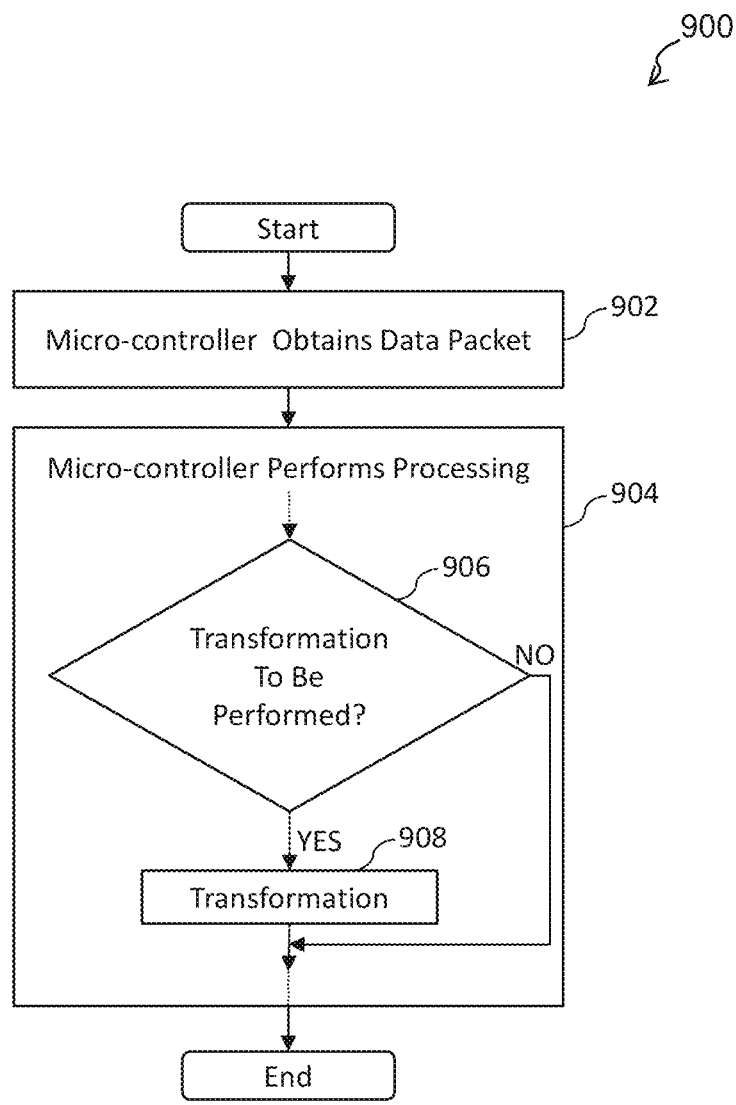
FIG. 9 depicts a flow diagram of a method for applying a transformation using a SBALE transform architecture according to one or more embodiments of the present invention.

Turning now to FIG. 9, a flow diagram of a method 900 for applying a transformation using a SBALE transform architecture is generally shown in accordance with one or more embodiments of the present invention. All or a subset of the processing shown in FIG. 9 may be performed, for example, by one or more micro-controllers 110 and/or transformation engine 132 of FIG. 1. The method 900 shown in FIG. 9 is one example of using a SBALE to determine whether a transform is to be applied to data being moved between a computing system, such as computing system 102 of FIG. 1, and an external storage device, such storage device 126 of FIG. 1, in-line to the data movement. In one or more embodiments of the present invention, at block 902 of FIG. 9, a micro-controller obtains (e.g., receives, is provided, retrieves) a data packet during an I/O input/output operation and performs processing associated with the data packet at block 904. For example, the micro-controller determines at block 906 whether a transformation is to be performed on data of the data packet. As an example, the micro-controller checks contents of an SBAL (e.g., SBAL 202 or SBAL 204 of FIG. 2) associated with the data packet to determine whether a transform is to be applied to the data. For example, the micro-controller can check the SBALEs within the SBAL to determine if any of them are operator SBALEs and if an operator SBALE is identified, the micro-controller can determine that a transform is to be applied to the data. In one or more of the embodiments of the SBALEs described above, bit 0 of the Flags field in the SBALEs is used to indicate whether the SBALE is an operator SBALE.

If it is determined, at block 906, that a transform is to be applied, then the micro-controller (e.g., transform engine 132 of FIG. 1) performs the transform on the data. For example, if an artificial intelligence transformation is selected and in particular, a specific artificial intelligence function is selected, such as the filter function, then the micro-controller performs the specified function on the data. Other transformations are similarly performed depending on the type of transformation. However, if no transform is to be applied, then a transformation is not performed.

In accordance with one or more embodiments of the present invention, the checking whether the transformation is to be performed at block 906 and the determining the transformation at block 908, if any, to be performed, are performed by one or more micro-controllers. For instance, the same micro-controller may perform both the checking and the determining or different micro-controllers may perform the checking and the determining. As another example, the checking may be performed by a micro-controller or logic of, e.g., the computing system, and based on the checking, a selected micro-controller or transformation engine performs the transformation. Various implementations are possible.

The processing shown in FIG. 9 is not intended to indicate that the operations are to be executed in any particular order, or that all of the operations shown in FIG. 2 are to be included in every case. Additionally, the processing shown in FIG. 2 can include any suitable number of additional operations.

Figure 10:
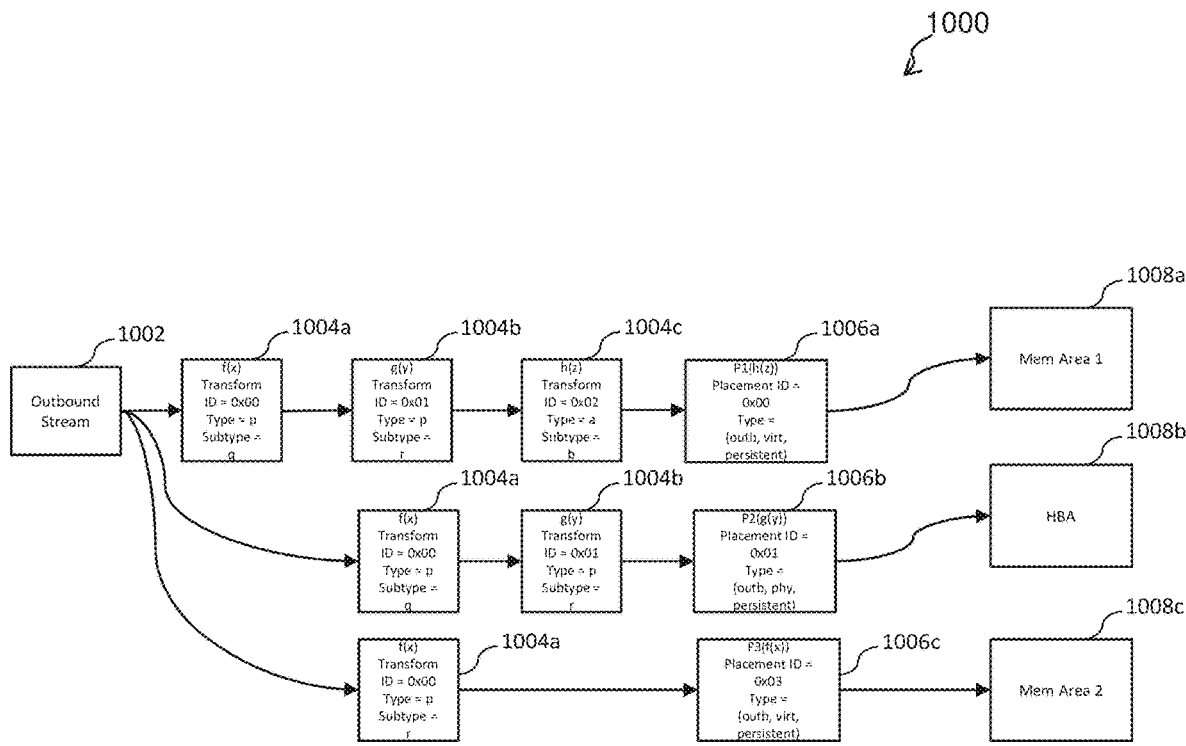
FIG. 10 depicts a block diagram of multiple transformation pipelines according to one or more embodiments of the present invention.

Turning now to FIG. 10, a block diagram 1000 of multiple transformation pipelines is generally shown in accordance with one or more embodiments of the present invention. As shown in FIG. 10, an outbound data stream 1002 is specified in an SBALE of an SBAL. Each block 1004a 1004b 1004c (referred to herein collectively as blocks 1004) 1006a 1006b 1006c (referred to herein collectively as blocks 1006) performs a transformation or placement of data. As shown in FIG. 10, a chain of transform operators (e.g., blocks 1004) have a placement operator (e.g., blocks 1006) at the end. In accordance with one or more embodiments of the present invention, a single transaction (described by a single SBAL) includes one or more transform/placement pipelines. The example shown in FIG. 10 includes three transform/placement pipelines that can be programmed in a single SBAL on a single transaction. Each of the pipelines is place in a different location: memory area 1 1008a, host bus adapter (HBA) 1008b, and memory area 2 1008c.

Providing different pipelines and be used to give different views of the same transactions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
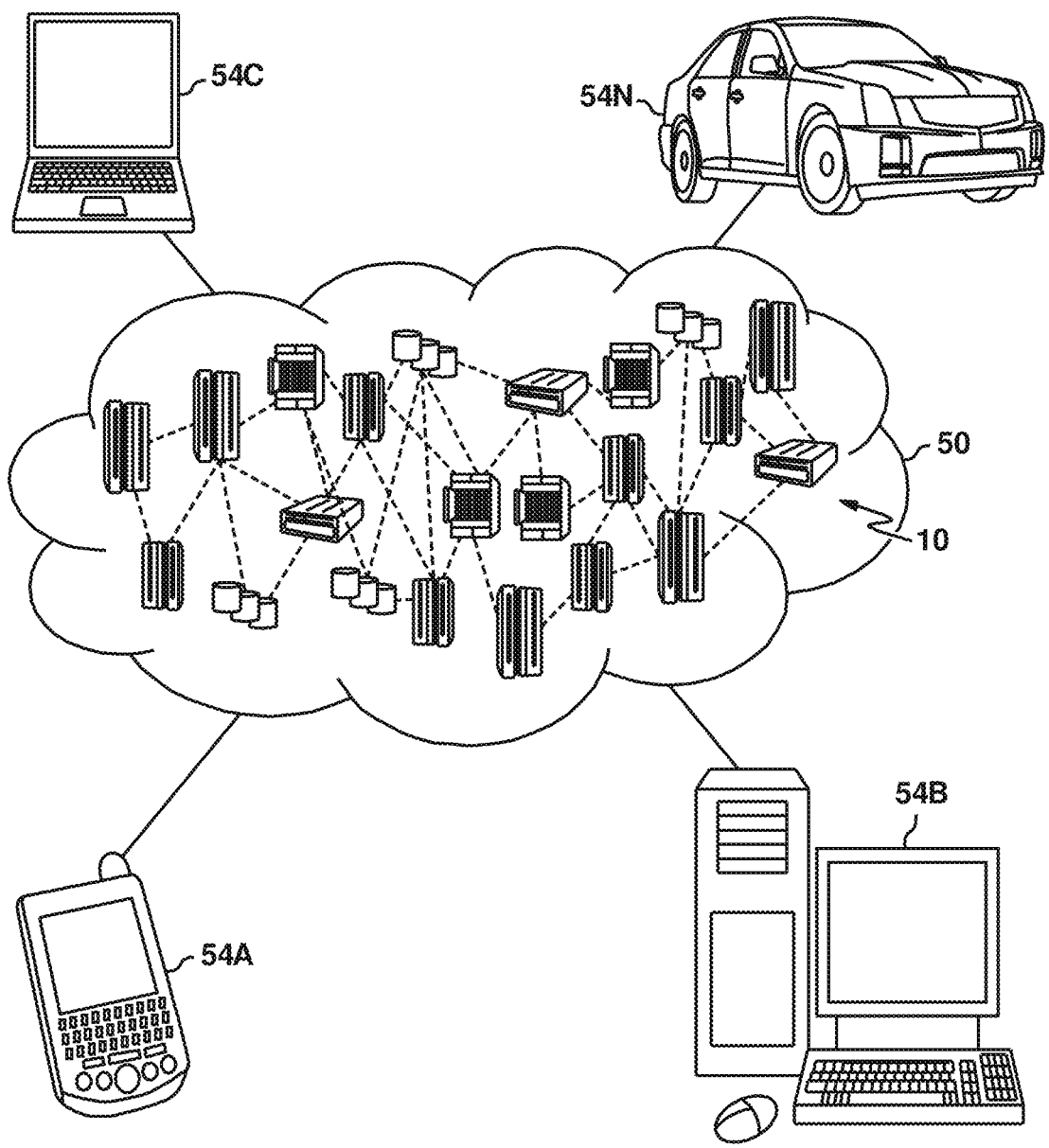
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
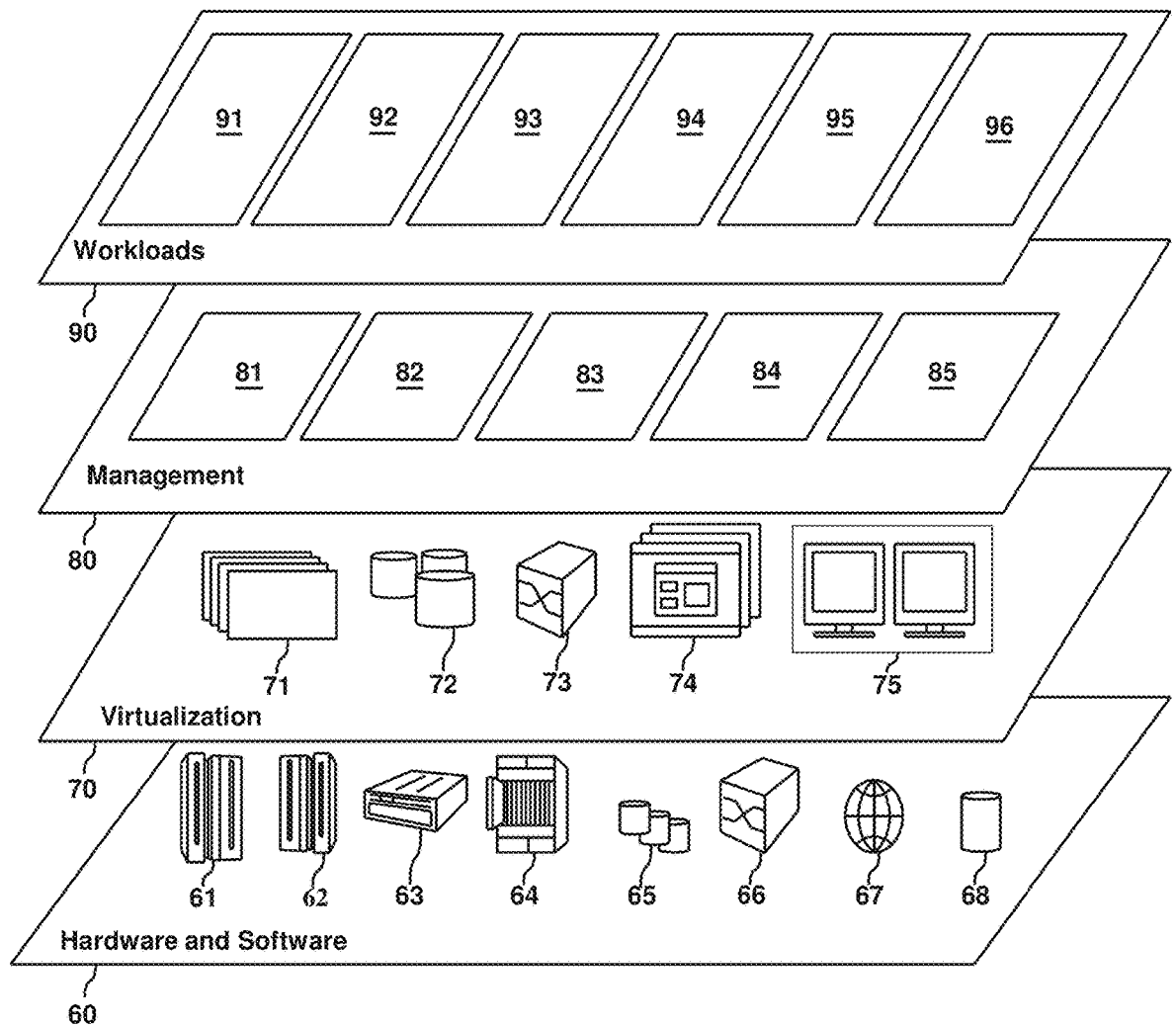
FIG. 12 depicts abstraction model layers according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 13:
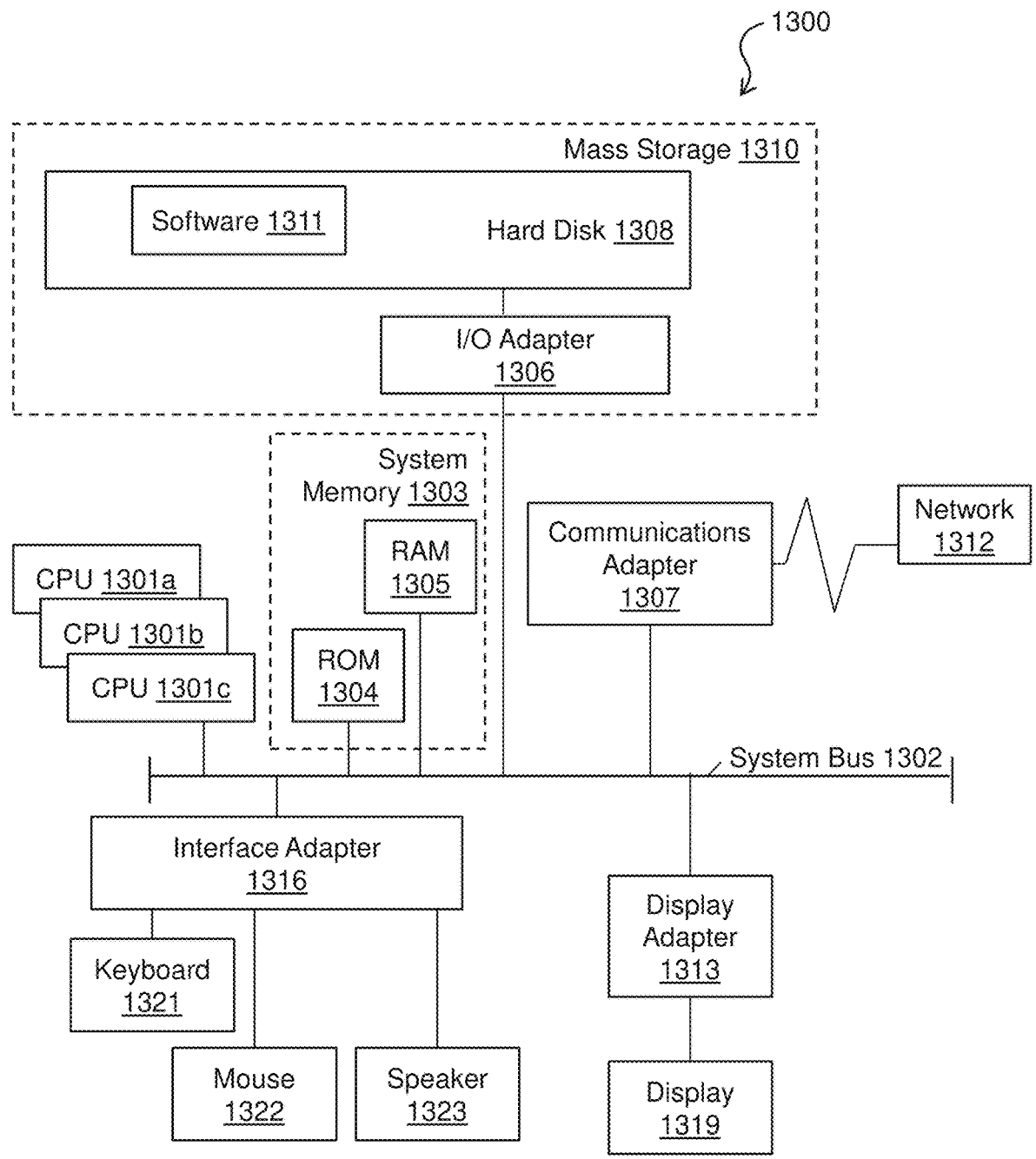
FIG. 13 illustrates a system for performing port mirroring according to one or more embodiments of the present invention.

Turning now to FIG. 13, a computer system 1300 is generally shown in accordance with an embodiment. All or a portion of the computer system 1300 shown in FIG. 13 can be implemented by one or more cloud computing nodes 10 of FIG. 11. The computer system 1300 can be an electronic, computer framework comprising and/or employing any number and combination of computing devices and networks utilizing various communication technologies, as described herein. The computer system 1300 can be easily scalable, extensible, and modular, with the ability to change to different services or reconfigure some features independently of others. The computer system 1300 may be, for example, a server, desktop computer, laptop computer, tablet computer, or smartphone. In some examples, computer system 1300 may be a cloud computing node. Computer system 1300 may be described in the general context of computer system executable instructions, such as program modules, being executed by a computer system. Generally, program modules may include routines, programs, objects, components, logic, data structures, and so on that perform particular tasks or implement particular abstract data types. Computer system 1300 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system 1300 has one or more central processing units (CPU(s)) 1301a, 1301b, 1301c, etc. (collectively or generically referred to as processor(s) 1301). The processors 1301 can be a single-core processor, multi-core processor, computing cluster, or any number of other configurations. The processors 1301, also referred to as processing circuits, are coupled via a system bus 1302 to a system memory 1303 and various other components. The system memory 1303 can include a read only memory (ROM) 1304 and a random access memory (RAM) 1305. The ROM 1304 is coupled to the system bus 1302 and may include a basic input/output system (BIOS), which controls certain basic functions of the computer system 1300. The RAM is read-write memory coupled to the system bus 1302 for use by the processors 1301. The system memory 1303 provides temporary memory space for operations of said instructions during operation. The system memory 1303 can include random access memory (RAM), read only memory, flash memory, or any other suitable memory systems.

The computer system 1300 comprises an input/output (I/O) adapter 1306 and a communications adapter 1307 coupled to the system bus 1302. The I/O adapter 1306 may be a serial advanced technology attachment (SATA) adapter that communicates with a hard disk 1308 and/or any other similar component. The I/O adapter 1306 and the hard disk 1308 are collectively referred to herein as a mass storage 1310.

Software 1311 for execution on the computer system 1300 may be stored in the mass storage 1310. The mass storage 1310 is an example of a tangible storage medium readable by the processors 1301, where the software 1311 is stored as instructions for execution by the processors 1301 to cause the computer system 1300 to operate, such as is described herein with respect to the various Figures. Examples of computer program product and the execution of such instruction is discussed herein in more detail. The communications adapter 1307 interconnects the system bus 1302 with a network 1312, which may be an outside network, enabling the computer system 1300 to communicate with other such systems. In one embodiment, a portion of the system memory 1303 and the mass storage 1310 collectively store an operating system, which may be any appropriate operating system, such as the z/OS® or AIX® operating system, to coordinate the functions of the various components shown in FIG. 13.

Additional input/output devices are shown as connected to the system bus 1302 via a display adapter 1315 and an interface adapter 1316 and. In one embodiment, the adapters 1306, 1307, 1315, and 1316 may be connected to one or more I/O buses that are connected to the system bus 1302 via an intermediate bus bridge (not shown). A display 1319 (e.g., a screen or a display monitor) is connected to the system bus 1302 by a display adapter 1315, which may include a graphics controller to improve the performance of graphics intensive applications and a video controller. A keyboard 1321, a mouse 1322, a speaker 1323, etc. can be interconnected to the system bus 1302 via the interface adapter 1316, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 13, the computer system 1300 includes processing capability in the form of the processors 1301, and storage capability including the system memory 1303 and the mass storage 1310, input means such as the keyboard 1321 and the mouse 1322, and output capability including the speaker 1323 and the display 1319.

In some embodiments, the communications adapter 1307 can transmit data using any suitable interface or protocol, such as the internet small computer system interface, among others. The network 1312 may be a cellular network, a radio network, a wide area network (WAN), a local area network (LAN), or the Internet, among others. An external computing device may connect to the computer system 1300 through the network 1312. In some examples, an external computing device may be an external webserver or a cloud computing node.

It is to be understood that the block diagram of FIG. 13 is not intended to indicate that the computer system 1300 is to include all of the components shown in FIG. 13. Rather, the computer system 1300 can include any appropriate fewer or additional components not illustrated in FIG. 13 (e.g., additional memory components, embedded controllers, modules, additional network interfaces, etc.). Further, the embodiments described herein with respect to computer system 1300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
obtaining data to be transformed;
determining a selected transformation to be applied to the data, the determining based on a storage block address list entry (SBALE) in a storage block address list (SBAL), the SBALE including at least one field that is used in determining the selected transformation to be applied;
performing a plurality of transformations including the selected transformation on the data to generate transformed data; and
placing the transformed data in a location specified by the SBAL,
wherein at least two of the plurality of transformations are performed on the data in parallel and at least a second transformed data is generated and placed in a second location.

2. The method of claim 1, wherein at least two of the plurality of transformations are performed sequentially on the data.

3. The method of claim 1, wherein the obtaining the data to be transformed is based on an indication that a transformation is to be applied to the data, wherein the indication is based on at least one additional field in the SBALE.

4. The method of claim 1, wherein the at least one field of the SBALE includes a transform type field, and wherein the determining the selected transformation includes checking the transform type field for an indication of the selected transformation.

5. The method of claim 4, wherein the at least one field further includes a transform sub-type field, and wherein the determining the selected transformation further includes checking the transform sub-type field for the indication of the selected transformation.

6. The method of claim 1, wherein the SBAL is used in transporting the data between the memory of the computing system and the external storage device coupled to the computing system via an input/output (I/O) subsystem.

7. The method of claim 1, wherein the selected transformation is one type of transformation of a plurality of types of transformations specified by the SBALE.

8. The method of claim 7, wherein the plurality of types of transformations includes a mathematical operation, a packet filter, statistical analysis, telemetry, and multicast replication.

9. The method of claim 1, wherein at least the determining is performed in-line with processing of the data between memory of a computing system and an external storage device coupled to the computing system.

10. A system comprising:
one or more processors for executing computer-readable instructions, the computer-readable instructions controlling the one or more processors to perform operations comprising:
obtaining data to be transformed;
determining a selected transformation to be applied to the data, the determining based on a storage block address list entry (SBALE) in a storage block address list (SBAL), the SBALE including at least one field that is used in determining the selected transformation to be applied;
performing a plurality of transformations including the selected transformation on the data to generate transformed data; and
storing the transformed data in a location specified by the SBAL,
wherein at least two of the plurality of transformations are performed on the data in parallel and at least a second transformed data is generated and placed in a second location.

11. The system of claim 10, wherein the obtaining the data to be transformed is based on an indication that a transformation is to be applied to the data, wherein the indication is based on at least one additional field in the SBALE.

12. The system of claim 10, wherein the at least one field of the SBALE includes a transform type field, and wherein the determining the selected transformation includes checking the transform type field for an indication of the selected transformation.

13. The system of claim 10, wherein the SBAL is used in transporting the data between the memory of the computing system and the external storage device coupled to the computing system via an input/output (I/O) subsystem.

14. The system of claim 10, wherein the selected transformation is one type of transformation of a plurality of types of transformations specified by the SBALE.

15. The system of claim 14, wherein the plurality of types of transformations includes a mathematical operation, a packet filter, statistical analysis, telemetry, and multicast replication.

16. The system of claim 10, wherein at least the determining is performed in-line with processing of the data between memory of a computing system and an external storage device coupled to the computing system.

17. A computer program product comprising a computer-readable storage medium having program instructions embodied therewith, the program instructions executable by one or more processors to cause the one or more processors to perform operations comprising:
obtaining data to be transformed;
determining a selected transformation to be applied to the data, the determining based on a storage block address list entry (SBALE) in a storage block address list (SBAL), the SBALE including at least one field that is used in determining the selected transformation to be applied;
performing a plurality of transformations including the selected transformation on the data to generate transformed data; and
storing the transformed data in a location specified by the SBAL,
wherein at least two of the plurality of transformations are performed on the data in parallel and at least a second transformed data is generated and placed in a second location.

* * * * *